Oct. 9, 1951  J. F. SHUMAKER  2,570,874
FLUID PRESSURE BRAKING SYSTEM
Filed April 14, 1950
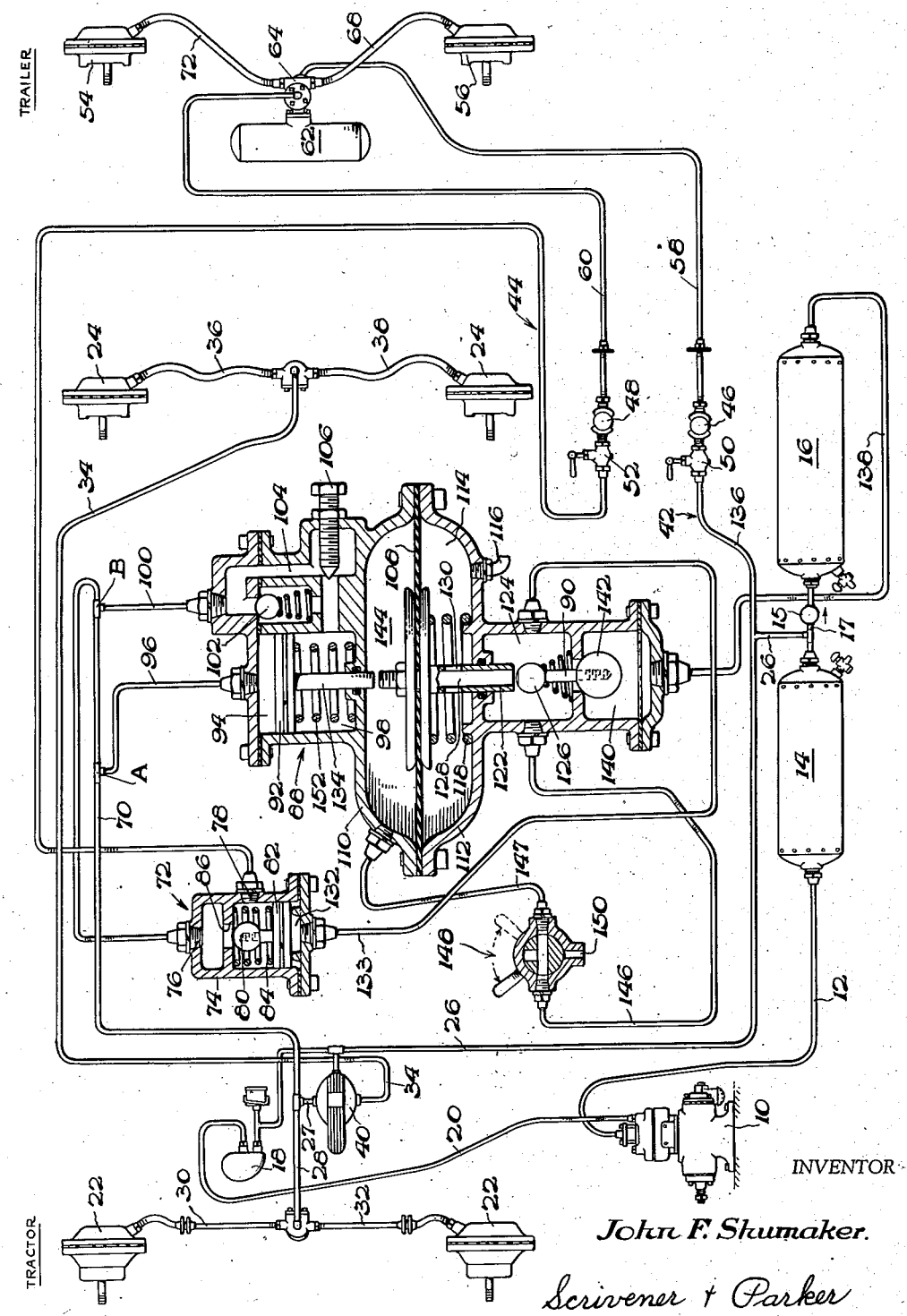
INVENTOR
John F. Shumaker.
Scrivener & Parker
ATTORNEYS Patented Oct. 9, 1951

2,570,874

UNITED STATES PATENT OFFICE 2,570,874

FLUID PRESSURE BRAKING SYSTEM

John F. Shumaker, Elyria, Ohio, assignor to Bendix-Westinghouse Automotive Air Brake Company, Elyria, Ohio, a corporation of Delaware Application April 14, 1950, Serial No. 155,842

15 Claims. (Cl. 303—84)

This invention relates to fluid pressure braking systems for tractor-trailer vehicles and more particularly to an arrangement for conserving fluid pressure on the tractor for efficient braking operations notwithstanding the occurrence of a break or leak of a brake chamber or serious leakage in various of the brake lines on the vehicles.

The fluid pressure braking systems of the type generally employed for tractor-trailer vehicles, have been so constituted as to include service and emergency lines on the vehicles which are respectively interconnected. The service lines are provided for the usual service applications of the vehicle brakes while the emergency lines are utilized for automatically applying the trailer brakes in the event of rupture or severe leakage in the emergency lines. During the usual service brake applications, fluid pressure is conducted from a suitable source on the tractor to the tractor brake chambers and in addition, such pressure is so conducted to the trailer service line in order to effect operation of a relay valve which thereby connects a trailer reservoir to the trailer brake chambers. Should the tractor or trailer service lines become broken or develop a severe leakage, fluid may be released from the source so rapidly that an effective service brake application on the tractor could not be obtained. In addition, and under such conditions, the leakage of fluid may be such as to prevent the trailer relay valve from functioning and thus a total failure of both the tractor and trailer brakes would result.

It is accordingly the principal object of the present invention to provide a fluid pressure brake system which is so constructed and arranged as to avoid the objections and disadvantages referred to above.

Another object is to provide in a tractor-trailer fluid pressure braking system, a novel construction for conserving the fluid pressure on the tractor in the event of a severe leak or breakage of the service brake lines of the tractor or trailer.

A further object is to provide a novel control device carried by the tractor which is so constituted that efficient braking of the tractor may be accomplished notwithstanding the fact that the service line on the trailer is open due to a rupture, or develops a severe leak.

A still further object is to provide a novel safety and control arrangement which is effective to interrupt the flow of fluid pressure from the tractor service line to the trailer service line in the event the pressure differential between two spaced-apart points in the tractor service lines exceeds a predetermined value.

Still another object resides in the provision of a cut-off valve positioned in the tractor service line which is operative to positively close and prevent substantial loss of fluid pressure from the tractor braking system when a severe leak occurs in the trailer braking system, such an arrangement thereby enabling the tractor brakes to be efficiently applied.

Still another object comprehends the provision of a relatively simple control device of the above character which is positive in its operation, and which does not interfere in any manner with the normal functioning of the brake systems on the two vehicles.

Other objects and novel features of the invention will appear more fully hereinafter from a consideration of the following detailed description when taken in connection with the accompanying drawing illustrative of one form of the invention. It is to be expressly understood however, that the drawing is utilized for purposes of illustration only and is not to be taken as a definition of the limits of the invention, reference being had for this latter purpose to the appended claims.

Referring to the drawing, the single figure thereof diagrammatically illustrates the present invention in connection with a tractor-trailer braking system of the fluid pressure operated type, certain of the parts being shown in section.

More particularly, and as shown in the drawing, the present invention is employed in connection with a tractor-trailer braking system of a well known type adapted to be operated by air under pressure. For example, the system includes a compressor 10 for supplying compressed air through a conduit 12 to a pair of serially connected reservoirs 14 and 16, the loading and unloading of the compressor being preferably controlled by governor 18 connected to the compressor 10 by means of a conduit 20. As shown, reservoir 16 is a protected reservoir, in view of the incorporation of a check or other suitable type of valve 15 in the connection 17. Governor 18 may be of any suitable construction such as that disclosed, for example, in the patent to B. S. Aikman No. 1,754,218, dated April 15, 1930. Front and rear braking chambers 22 and 24 are provided for respectively applying the front and rear brakes to the tractor and these chambers may be supplied with air pressure from the reservoir 14 through conduits 26, 27, 28, 30, 32, 34, 36 and 38, a suitable pedal operated brake valve 40 being associated with the conduits 26, 27 and 34 in order to control the degree of brake application of the front and rear brake chambers. The brake valve 40 may be of any suitable construction well known in the art, an example being shown in the patent to W. J. Andres et al. No. 2,133,275, dated October 18, 1938.

In order to provide suitable connections for the trailer braking system, the tractor braking system includes an emergency line 42 as well as the service line 44. The emergency and service lines 42 and 44 terminate in coupling parts of well known construction which are adapted to be coupled with similar parts associated with the trailer braking system in order to provide releasable couplings 46 and 48. In addition, the trailer emergency and service lines are respectively provided with cut-off cocks 50 and 52 in order to positively cut off these lines when the couplings 46 and 48 are disconnected prior to separation of the vehicles.

The trailer braking system includes a plurality of brake chambers, two of which are illustrated at 54 and 56. Such system also includes an emergency line 58, a service line 60 and a trailer reservoir 62, all of the foregoing being interconnected through a relay-emergency valve 64 of any suitable construction, such as for example that shown in the patent to S. Johnson, Jr., No. 2,818,212, dated October 22, 1935. In the normal operation of the valve 64, the emergency line 58 is normally connected with the reservoir 62 in order to maintain the latter charged with air pressure from the tractor reservoir 16. The valve 64 is also of such construction as to connect the trailer reservoir 62 with the brake chambers 54 and 56 through conduits 66 and 68 whenever the service line 60 is charged with fluid pressure by reason of the operation of the tractor brake valve 40. The construction is moreover also such, that in the event of a rupture or severe leakage of the emergency line 58, the valve 64 functions to automatically supply air pressure to the brake chambers 54 and 56 from the reservoir 62 in order to effect an emergency application of the trailer brakes.

From the foregoing description, it will be appreciated that in order to effect a normal service application of the tractor and trailer brakes, it is only necessary for the operator to actuate the pedal of the brake valve 40. This action serves to conduct air pressure from the reservoir 14 to the tractor front brake chambers 22 as by way of conduits 26, 27, 28, 30 and 32. Simultaneously, air pressure is also conducted to the tractor rear brake chambers 24 through conduits 34, 36 and 38. In addition, the tractor service line 44 is charged with fluid pressure through a conduit 70 in order to supply air pressure to the trailer service line 60 to effect an application of the trailer brake chambers 54 and 56 through operation of the valve 64 which controls the trailer reservoir 62.

In the event that a severe leakage occurs in the service lines of the tractor or trailer, it will be readily understood that upon actuation of the brake valve 40, the fluid pressure in the reservoir 14 might be depleted so rapidly that efficient application of the tractor and trailer brakes could not be effected. Such a severe leak might be caused by a broken service line on the tractor or trailer or by reason of an accidental parting of the couplings 46 and 48. By the present invention, this difficulty is overcome and an efficient application of the tractor brakes may be effected notwithstanding that the service lines have developed the severe leakage just referred to.

More particularly, the present invention includes a novel arrangement for positively interrupting the flow of air through the tractor service line 44 in the event that a predetermined pressure differential between two spaced-apart points exists. Such a pressure differential would be caused by a broken or ruptured service line and in such event, the construction provided by the present invention causes the flow of air pressure through the tractor service line to be interrupted. More particularly, the invention includes a fluid pressure responsive cut-off valve 72 which is positioned on the tractor and is arranged in the tractor service line 44. As shown, the valve 72 includes a casing 74 having inlet and outlet ports 76 and 78 which are respectively connected with the conduit 70 and the tractor service line 44. Normally, the ports 76 and 78 communicate with each other past a normally open valve 80 which is carried by a pressure responsive element 82. In the position shown, the element 82 is moved downwardly in response to the action of a spring 84. However, upon the application of fluid pressure beneath the element 82, the element and the valve 80 will be moved upwardly in order to bring the latter into contact with a seat 86 and thus interrupt flow of fluid pressure from the inlet port 76 to the outlet port 78.

A novel arrangement is provided by the present invention for controlling the application of fluid pressure to the cut-off valve 72, and more particularly, such an arrangement is so constituted as to cause operation of the valve to close off the service line 44 in the event that the service lines of the vehicles are broken or develop serious leakage which might be of such magnitude as to prevent effective application of any of the tractor brakes. More particularly, the foregoing construction includes a control valve device 88 which includes a pilot valve 90 adapted to be operated and controlled by movement of a pressure responsive element or piston 92, and also includes the reservoir 16 which provides a protected source of fluid pressure for controlling the cut-off valve 72.

For the purpose of effectively controlling the pilot valve 90 and also the cut-off valve 72, the action of the piston 92 is controlled by an air pressure differential occurring between two spaced-apart points in the tractor service line, illustrated at A and B in the drawing. With such an arrangement, fluid pressure from the conduit 70 may be conducted to a pressure chamber 94 above the piston 92 through a conduit 96. Also, fluid pressure from point B may be conducted to a control chamber 98 beneath the piston 92 by way of a conduit 100. It will be observed that the connection between conduit 100 and control chamber 98 includes a normally spring-closed check valve 102 and a by-pass duct 104 controlled by a needle valve 106, these parts being provided for a purpose to be pointed out more fully hereinafter.

In addition to the piston 92, the valve device 88 includes a diaphragm 108 which is clamped between upper and lower casing sections 110 and 112. The chamber 114 beneath the diaphragm is normally open to atmosphere through an exhaust port 116 and such chamber also includes a spring 118 for resiliently opposing downward movement of the diaphragm 108. A valve actuating member 122, carried by the diaphragm 108, extends into an outlet chamber 124, and as shown, the member 122 is normally spaced from an exhaust valve 126 in order to connect the chamber 124 with the atmosphere by way of bore 128, openings 130 and port 116. With such an arrangement, it will be readily understood that in the normal position of the parts illustrated, chamber 132 beneath the element 82, and communicating with the chamber 124 through conduit 133, will be subjected to atmospheric pressure and the cut-off valve 72 will remain open. However, under certain conditions, as will appear hereinafter, the piston 92 will be moved downwardly so that a piston rod 134 carried thereby and spaced from the member 122, as shown, will engage and move the member 122 to a valve opening positioned. In such event the chamber 132 will be charged with pressure from the protected reservoir 16 by way of conduit 138, inlet chamber 140, open inlet valve 142, chamber 124 and conduit 133 in order to close the valve 80. Thus when the piston 92 is moved downwardly to open the pilot valve 90, the service line 44 on the tractor will be closed through operation of the cut-off valve 72.

Preferably the invention provides an arrangement whereby the cut-off valve 72 remains closed except when manually released. This function is achieved by connecting the outlet chamber 124 to chamber 144 above the diaphragm 108 by way of conduits 146 and 147 together with a manually operable three-way valve 148 therein. Thus when the valve 148 occupies the position shown in full lines, reservoir pressure will be conducted through the valve to the chamber 144, and the diaphragm 108 will maintain the pilot valve 90 open notwithstanding the return of the piston 92 to the normal position illustrated. Hence it will be appreciated that the cut-off valve 72 will remain closed. If it is desired to open the cut-off valve after the piston 92 has returned to its normal position, it is only necessary to move the valve 148 to its dotted line position to block the conduit 146 and connect the chamber 144 to an atmospheric port 150.

In normal operation, brake-applying movement of the tractor brake valve 40 serves to charge the tractor brake chambers 22 and 24 and to also charge the conduit 70 and the tractor and trailer service lines 44 and 60. As well understood, the tractor brakes will then be applied and the trailer brake chambers 54 and 56 will become charged from the trailer reservoir 62 through operation of the relay-emergency valve 64. During such charging of the conduit 70, the piston 92 of the control valve device 88 will not move a sufficient distance to open the pilot valve 90. This action will be readily understood from the fact that the pressures at points A and B are substantially equal and that the fluid from point B will readily flow past the check valve 102 to the control chamber 98. Hence the pressures above and below the piston 92 will substantially immediately become balanced. While initial charging of the conduit 70 may produce a slight downward movement of the piston 92, this slight movement is permitted by the spacing of the piston rod 134 from the member 122. Moreover such movement is resisted by a return spring 152 and the dash pot action provided by the atmospheric air within the chamber 98 which is partially trapped therein by the restriction afforded by the needle valve 106. Hence under these conditions, any movement of the piston 92 will not be sufficient to move the member 122. During release of the tractor and trailer brakes, the conduit 70 and the service lines 44 and 60 will be exhausted and the pressure chamber 94 will be likewise exhausted through conduits 96 and 70. Due to the restriction of the needle valve 106, control chamber 98 will be exhausted at a slower rate than chamber 94, but will be substantially promptly reduced to atmospheric pressure by way of the needle valve 106, duct 104 and conduits 100 and 70. Thus during ordinary service brake operations, the control valve device will not operate and the cut-off valve 72 will remain in open position through the action of the spring 84.

On the other hand, and assuming that the service line connection between valves 72 and 64 is ruptured or develops a severe leak, then in that event, the present invention is effective to close the valve 72 upon operation of the brake valve 40 and this action conserves the supply of air on the tractor and enables an effective application of the tractor brakes to be accomplished. More particularly and under the above mentioned conditions, when the tractor brake valve 40 is applied, the pressure chamber 94 will be charged with fluid pressure from point A through conduit 96 and the downward movement of the piston 92 will be initially retarded by the atmospheric air trapped in the chamber 98 by the check valve 102 and the restriction of the needle valve 106. While fluid pressure from point B may subsequently be admitted to the control chamber 98 past the check valve 102, it will be understood that the differential of fluid pressure between points A and B, due to the leakage in the service lines 44 or 60 is substantial. Hence, after an interval of time determined by the setting of the needle valve 106, or other variable equivalent restriction, the fluid pressure differential existing on opposite sides of the piston 92 will be sufficient to effect downward movement thereof in order to move the member 122 and operate the pilot valve 90. During such movement of the member 122, the exhaust valve 126 will be first contacted in order to close the exhaust connection to the chamber 132. Thereafter, continued movement of the piston rod 134 downwardly effects an opening of the valve 142 in order that the chamber 132 may be charged with fluid pressure from the protected reservoir 16 by way of conduit 138, chambers 140 and 124 and conduit 133. Thus the cut-off valve 72 will close and prevent any further loss of fluid pressure from the tractor service line 44 and the tractor brakes may hence be effectively applied.

From the foregoing description, it will also be understood that upon operation of the pilot valve 90, the chamber 144 will also be supplied with fluid pressure from the protected reservoir 16 by way of conduit 138, chamber 140, conduit 146, the open valve 148 and conduit 147. This action serves to keep the pilot valve 90 open to maintain the cut-off valve 72 closed notwithstanding the movement of the tractor brake valve 40 to its exhaust position. Hence even though the trailer service line 60 develops a severe leakage, repeated applications of the tractor brakes may be made in order to safely control the vehicle train pending repair of the break.

In the event the leakage referred to is due to a break-in-two of the vehicles, it will be understood of course, that parting of the emergency lines 42 and 58 will automatically apply the trailer brakes through operation of the relay-emergency valve 64 and that the cut-off valve 72 will close as described above. Although the tractor emergency line 42 will be vented to atmosphere under these conditions, the loss in pressure from the tractor reservoir 14 will not be sufficient to prevent an application of the tractor brakes. Thus during operation of the tractor brake valve 40 following a parting of the vehicles, the parts including the control device 88, the pilot valve 90 and the cut-off valve 72 will function in the manner previously set forth in order to cut off the flow of fluid pressure through the tractor service line 44. Hence even though pressure is being exhausted to atmosphere through the open tractor emergency line 42, still sufficient pressure will be available for effecting an effective braking of the tractor.

From the foregoing, it will be readily perceived that the present invention provides a novel and efficient braking system wherein the compressed air on the tractor is conserved for tractor braking purposes in the event of a broken service line or a parting of the vehicles. The incorporation of the cut-off valve 72 insures that the loss of a substantial amount of available air pressure from the tractor reservoir will be prevented, even though the service and emergency lines of the vehicles may both be open to atmosphere. It will also be understood that while the control device 88 is so arranged as to be inoperative during brake applications under normal conditions, it nevertheless is effective to close the cut-off valve 72 in case a serious leakage in the tractor or trailer service lines occurs. In such event, the control device 88 is moved in accordance with the pressure differential existing at spaced-apart points in the tractor service line after a time delay interval determined by the setting of the needle valve 106 or other restriction in parallel with the check valve 102. Under normal conditions, the use of the check valve 102 and the restricted by-pass 104 provides a dash-pot action for the piston 92 in order to prevent movement of the latter during initial charging of the chamber 94, and until such time as the fluid from point B flows to the control chamber 98 past the check valve and balances the pressure in the pressure chamber 94.

While one embodiment of the invention has been shown and described herein with considerable particularity, it will be readily understood by those skilled in the art that various modifications may be restorted to without departing from the spirit of the invention. Rerefence will therefore be had to the appended claims for a definition of the limits of the invention.

What is claimed is:

1. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, and means to supply fluid pressure to the latter valve to close the same and thereby interrupt the flow of fluid pressure therethrough, comprising a fluid pressure differential operated control device including a fluid pressure actuator, means to subject one side of said actuator to the pressure existing at one point in said one conduit, means to subject the opposite side of said actuator to the pressure existing at another point in said one conduit, a check valve associated with the last named means, and a restricted by-pass around the check valve.

2. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, and means to supply fluid pressure to the latter valve to close the same and thereby interrupt the flow of fluid pressure therethrough, comprising a pilot valve, a fluid actuator including a pressure responsive element movable for operating said pilot valve, a conduit for subjecting one side of said element to the pressure existing at one point in said one conduit, a second conduit for subjecting the opposite side of the element to the pressure existing at another point in said one conduit, a check valve in said second conduit, and a restricted by-pass around the check valve.

3. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, and means to supply fluid pressure to the latter valve to close the same and thereby interrupt the flow of fluid pressure therethrough comprising a pilot valve, a fluid actuator including a pressure responsive element movable for operating said pilot valve, said actuator being provided with a pressure chamber on one side of said element and a control chamber on the opposite side of said element, means affording an unrestricted connection between the pressure chamber and said one conduit at a predetermined point therein, means connecting the control chamber to said one conduit at another point spaced from the first named point so that said element will be subjected to a fluid pressure differential occurring between said points upon flow of fluid pressure through said one conduit, and means associated with said control chamber for preventing valve operating movement of said element when said pressure differential is less than a selected value and for allowing valve operating movement of said element when said pressure differential reaches or exceeds said selected value.

4. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, and means to supply fluid pressure to the latter valve to close the same and thereby interrupt the flow of fluid pressure therethrough comprising a pilot valve, a fluid actuator including a pressure responsive element movable for operating said pilot valve, said actuator being provided with a pressure chamber on one side of said element and a control chamber on the opposite side of said element, means affording an unrestricted connection between the pressure chamber and said one conduit at a predetermined point therein, means connecting the control chamber to said one conduit at another point spaced from the first named point so that said element will be subjected to a fluid pressure differential occurring between said points upon flow of fluid pressure through said one conduit, and means associated with said control chamber for preventing valve operating movement of said element when said pressure differential is less than a selected value and for allowing valve operating movement of said element when said pressure differential reaches or exceeds said selected value, said last named means including a check valve in said connecting means arranged to allow flow of fluid to the control chamber only, and a controllable by-pass around the check valve.

5. In a fluid pressure operated vehicle braking system, a source of fluid pressure, a plurality of brake chambers, a brake valve connected with said source, a plurality of conduits connecting the brake valve and chambers, said brake valve being operable to connect said source with said conduits to charge the latter and to connect the conduits to atmosphere to exhaust the same, a normally open fluid pressure operated valve in one of the conduits, means including a pilot valve movable to a position for connecting said source to said fluid pressure operated valve to close the latter when the pressure differential created between spaced-apart points in said one conduit due to the flow of fluid therein reaches a predetermined value, and means for maintaining said fluid pressure operated valve closed after said pressure differential is reduced to zero due to the exhausting of said one conduit.

6. The combination as set forth in claim 5 which comprises in addition, manually operable means for releasing said maintaining means.

7. In a fluid pressure operated vehicle braking system, a source of fluid pressure, a plurality of brake chambers, a brake valve connected with said source, a plurality of conduits connecting the brake valve and chambers, said brake valve being operable to connect said source with said conduits to charge the latter and to connect the conduits to atmosphere to exhaust the same, a normally open fluid pressure operated valve in one of the conduits, means including a pilot valve movable to a position for connecting said source to said fluid pressure operated valve to close the latter when the pressure differential created between spaced-apart points in said one conduit due to the flow of fluid therein reaches a predetermined value, and means for maintaining said pilot valve in its connecting position after said pressure differential is reduced to zero due to the exhausting of said one conduit.

8. The combination as set forth in claim 7 which comprises in addition, manually operable means for releasing said maintaining means.

9. In a fluid pressure operated vehicle braking system, a source of fluid pressure, a plurality of brake chambers, a brake valve connected with said source, a plurality of conduits connecting the brake valve and chambers, said brake valve being operable to connect said source with said conduits to charge the latter and to connect the conduits to atmosphere to exhaust the same, a normally open fluid pressure operated valve in one of the conduits, means including a pilot valve movable to a position for connecting said source to said fluid pressure operated valve to close the latter when the pressure differential created between spaced-apart points in said one conduit due to the flow of fluid therein reaches a predetermined value, and means for maintaining said pilot valve in its connecting position after said pressure differential is reduced to zero due to the exhausting of said one conduit, said last named means including a fluid pressure actuator communicating with said source and said fluid pressure operated valve when said pilot valve is moved to said connecting position.

10. The combination as set forth in claim 9 which comprises in addition, manually operable means for releasing said maintaining means.

11. In a fluid pressure operated tractor-trailer braking system having interconnected tractor and trailer service and emergency lines, a source of fluid pressure on the tractor, a tractor brake valve for controlling the flow of fluid pressure from said source through the service lines, and means for interrupting said flow through the tractor service line comprising a normally open fluid pressure responsive valve in the tractor service line, a fluid pressure actuator movable in response to a predetermined pressure differential created between spaced-apart points in said tractor service line, means including a pilot valve operable by movement of said actuator for supplying fluid pressure to the fluid pressure responsive valve to close the same and thereby interrupt said flow through the tractor service line, and means for maintaining said fluid presure responsive valve closed after the pressure in the tractor service line is reduced to zero.

12. The combination as set forth in claim 11 which comprises in addition, manually operable means for releasing said maintaining means.

13. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure actuated valve in the tractor service line, a pilot valve normally occupying a first position connecting the fluid pressure actuated valve with the atmosphere and movable to a second position to interrupt the atmospheric connection and connect said source with the fluid pressure actuated valve to close the latter, a fluid pressure operated device for moving the pilot valve to said second position, and means for subjecting said device to a pressure differential created at spaced-apart points in said tractor service line.

14. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure actuated valve in the tractor service line, a pilot valve normally occupying a first position connecting the fluid pressure actuated valve with the atmosphere and movable to a second position to interrupt the atmospheric connection and connect said source with the fluid pressure actuated valve to close the latter, a fluid pressure operated device for moving the pilot valve to said second position, means for subjecting said device to a pressure differential created at spaced-apart points in said tractor service line, and means for maintaining said pressure actuated valve in closed position after the pressure in the tractor service line is reduced to zero.

15. The combination as set forth in claim 14 which comprises in addition, manually operable means for releasing said maintaining means.

JOHN F. SHUMAKER.

REFERENCES CITED

The following references are of record in the file of this patent:

UNITED STATES PATENTS

| Number | Name | Date |
| --- | --- | --- |
| 1,797,431 | Mathieson | Mar. 24, 1931 |
| 1,969,812 | McCune | Aug. 14, 1934 |
| 2,084,707 | Robinson | June 22, 1937 |
| 2,407,890 | McClure | Sept. 17, 1946 |
| 2,451,139 | Williams et al. | Oct. 12, 1948 |